3,096,323
GLUCOSE ISOBUTYRAL

George P. Touey and John E. Kiefer, Kingsport, Tenn., assignors to Eastman Kodak Company, Rochester, N.Y., a corporation of New Jersey
No Drawing. Filed Sept. 4, 1959, Ser. No. 838,039
2 Claims. (Cl. 260—209)

This invention relates to organic solvent-soluble glucose acetals, more particularly to glucose isobutyral containing from 2.5 to 3.5 condensed isobutyraldehyde molecules in its structure.

Glucose has been previously reacted with an aldehyde or ketone in the presence of a mineral acid catalyst, and a number of mono-and diacetals and ketals of glucose are known. These materials have been used as intermediates in the synthesis of various sugar derivatives by blocking certain hydroxyl groups on glucose with the acetal or ketal linkages so that the other hydroxyl group could be etherified or esterified. Following the esterifying or etherifying reaction, a mild hydrolysis with acid restores the acetalyzed hydroxyl group for further reaction.

The known glucose mono and diacetals of lower molecular weight aliphatic aldehydes containing up to 4 carbon atoms are useful chemical intermediates, but they have been of little value as plasticizers or extenders in film formulations and the like. Due to the presence of at least one free hydroxyl group in the glucose derivative, the glucose composition has sufficient solubility in water to allow it to be leached out of a film or coating formulation. This characteristic is unsatisfactory especially when a film or coating is exposed to the weather. In addition, its water susceptibility renders the product more sensitive to hydrolysis, especially in aqueous solutions containing a trace of an acid catalyst.

In order to avoid the difficulties experienced with the lower molecular weight aldehyde, it has been suggested to employ a fairly long-chain aldehyde as the acetylizing agent and in this way to circumvent the water and hydrolysis susceptibility of the glucose acetals. These higher acetals are considerably less water-soluble due to the presence of the more hydrophobic groups on the glucose, but the higher molecular weight acetals of glucose cannot be produced in good yields by simple economical methods. Therefore, they are unattractive commercially as plasticizers or extenders for films and coatings.

Other disadvantages of low-molecular-weight mono and diacetals of glucose are their storage instability. This often results in the formation of strong, objectionable odors in films containing such products as extenders and plasticizers. In addition, many are crystalline compounds rather than liquids. Such crystalline products have a tendency to produce brittle films when they are added to the film-forming material in appreciable quantities.

We have found that a new type of glucose acetal containing from 2.5 to 3.5 condensed isobutyraldehyde molecules in its structure can be produced and can be used as an extender and plasticizer free from the above defects noted when the prior-art acetals were used.

One object of this invention is to provide a glucose acetal which can be used as a plasticizer and extender for films and coatings of cellulose derivatives and synthetic polymers. Another object is to provide a method of obtaining a glucose acetal containing from 2.5 to 3.5 condensed isobutyraldehyde molecules in its structure. An additional object is to obtain a glucose isobutyral which contains less than 4 percent free hydroxyl groups. Another object is to produce a glucose isobutyral which is substantially water insoluble.

These objects are accomplished by refluxing one mole of glucose in 5 to 10 moles of isobutyraldehyde in the presence of a strong acid catalyst until from 1.5 to 3 moles of water are removed from the mixture azeotropically. The catalyst is then removed by washing the product with water or dilute alkali and finally any excess isobutyraldehyde is removed by vacuum distillation.

The preferred catalyst for the condensation of the isobutyraldehyde is boron trifluoride. However, other strong acids and acid salts which are known catalysts for acetal formations can be employed. No diluent for the reaction is required, because the isobutyraldehyde functions as both a reactant and a diluent for the reaction. In addition, isobutyraldehyde also functions as the azeotroping agent for the removal of water during the reaction. The temperature of the reaction is controlled by the refluxing isobutyraldehyde and isobutyraldehyde-water azeotropes. Normally this temperature is within the range of 60 to 70° C.

Although the exact structure of the glucose isobutyral is not known, its analysis corresponds to the product formed by the condensation of between 2.5 to 3.5 moles of isobutyraldehyde with one mole of glucose. The carbon content of the product will vary between 60 and 65 percent and its hydroxyl content will vary between 0 and 4.0 percent.

The following examples illustrate our invention but are not intended to limit it in any way:

EXAMPLE 1

One mole of glucose monohydrate (198 g.), 6 moles (432 g.) of isobutyraldehyde, and 2 g. of boron trifluoride dihydrate were refluxed at 65–70° C. The apparatus used for this operation was one which condensed and separated the isobutyraldehyde-water azeotrope and allowed the isobutyraldehyde to return to the reaction flask. The extent of reaction was followed by determining the quantity of water collected in the azeotrope. After the desired amount of water was removed, the catalyst was neutralized with aqueous sodium bicarbonate and the excess isobutyraldehyde was distilled off under reduced pressure. The highly viscous glucose isobutyral was then dissolved in hexane and washed with water to remove the salts. Finally the hexane was stripped from the product under reduced pressure. All of the products were water white, very viscous liquids. Table 1 shows how the chemical composition of the products changed as the amount of water removed was increased.

*Table 1*

| Sample | A | B | C |
|---|---|---|---|
| Moles of water of reaction [1] | 1.0 | 2.0 | 2.5 |
| Percent Carbon | 59.74 | 61.59 | 63.94 |
| Percent Hydrogen | 8.66 | 9.01 | 9.21 |
| Percent Hydroxyl | 5.87 | 3.55 | 1.50 |

[1] In addition to 1 mole of water of hydration which was also removed.

The water solubility of the products were tested as follows: Fifty parts of glucose isobutyral and 50 parts of cellulose ester were mixed and dissolved in a volatile solvent. The dopes were cast on a glass plate with a doctor blade. The blade was adjusted so that the dried films would be 1.5–2.0 mils thick. After the solvent had evaporated, the films were stripped from the glass and dried 4 hrs. at 80° C. The films were cut into 2-in. squares, weighed, then suspended in water for 48 hrs. at 30° C. The films were again dried at 80° C. and weighed. The percent water extractables was calculated as the total weight loss divided by the weight of the glucose isobutyral in the film sample. Table 2 shows how the water-extractable material varies with the degre of reaction.

Table 2

| Sample | 1 | 2 | 3 |
|---|---|---|---|
| Moles of water of reaction removed during preparation [1] | 1.0 | 2.0 | 2.5 |
| Percent glucose isobutyral extracted from cellulose acetate butyrate | 15 | 11 | 3 |
| Percent glucose isobutyral extracted from cellulose nitrate | 8 | 6 | 2 |

[1] In addition to 1 mole of water of hydration which was also removed.

EXAMPLE 2

Glucose isobutyral as an extender for a cellulose acetate butyrate film.

A dope consisting of 10 g. of glucose isobutyral prepared as in Example 1, 30 g. cellulose acetate butyrate, 30 g. of toluene, 20 g. of ethyl acetate, and 10 g. of ethyl alcohol was cast on a glass plate with a doctor blade. The films were dried and cut into ½-in. by 12-in. strips 3 mils thick. The films had a tensile strength of 4,800 pounds per square inch and an elongation of 80%. The film was clear, flexible, and free from any tackiness.

EXAMPLE 3

Glucose isobutyral as an extender for a cellulose triacetate film.

A dope consisting of 5 g. of glucose isobutyral prepared as in Example 1 of equal parts isobutyral and triacetate, 15 g. of cellulose triacetate, 72 g. of dichloromethane, and 8 g. of methanol was cast on a glass plate with a doctor blade. The films were dried and cut into ½-in. by 12-in. strips 3 mils thick. The films had a tensile strength of 11,500 pounds per square inch and an elongation of 23%. They were non-tacky, clear, and flexible.

EXAMPLE 4

Glucose isobutyral as a plasticizer for a cellulose acetate butyrate plastic.

One hundred parts of cellulose acetate butyrate were mixed with 25 parts of the type glucose isobutyral prepared in Example 1. The mixture was rolled on hot rolls until a uniform plastic mass was obtained. The mass was cooled, ground, then extruded into plastic test bars. The bars had a tensile strength of 4,200 pounds and an elongation of 82%.

EXAMPLE 5

Glucose isobutyral as an extender and plasticizer for a polyvinyl acetate melt coating.

One hundred parts of polyvinyl acetate were heated with 100 parts of glucose isobutyral as prepared in Example 1 of equal parts isobutyral and polyvinyl acetate. A homogeneous hot melt with a viscosity of 1,000 centipoises was obtained when the temperature reached 150° C. This hot melt was extruded from a horizontal slit onto a sheet of cardboard backing paper. The cooled coating was clear and flexible and adhered tenaciously to the paper backing.

Although the glucose isobutyral of this invention is a plasticizer and extender for various film formulations, if desired additional plasticizers can be used on the formulations.

The catalyst concentration may range from 0.1 to 5 percent based on the weight of the sugar. Ordinarily, a concentration of 1 percent catalyst is sufficient.

Although glucose is a preferred sugar for use in this invention, it is understood that other mono or other disaccharides can be used in this invention, for example, sucrose, lactose, maltose, and cellobiose or other sugar materials as sorbitol (hydrogenated glucose) and alpha-methyl-D-glucoside.

The isobutyrals prepared according to this invention may be used as plasticizers and extenders in cellulose derivatives such as cellulose acetate, cellulose acetate butyrate, ethyl cellulose, cellulose nitrate and the like. It may also be used in other organic polymeric materials such as polyvinyl acetate, polyvinyl chloride, copolymers of these two materials, vinyl chloride-vinylidene chloride copolymers and the like. An amount of 5–200% of the extender may be used based on the weight of the polymeric material being plasticized or extended.

We claim:

1. Glucose isobutyral containing in its structure from 2.5 to 3.5 isobutyraldehyde molecules and less than 4% hydroxyl groups.

2. A saccharide isobutyrol containing in its structure from 2.5 to 3.5 isobutyraldehyde molecules and less than 4% hydroxyl groups.

References Cited in the file of this patent

UNITED STATES PATENTS

| | | |
|---|---|---|
| 2,321,094 | MacDowell et al. | June 8, 1943 |
| 2,331,090 | Gabel et al. | Oct. 5, 1943 |
| 2,387,662 | Holst | Oct. 23, 1945 |
| 2,461,478 | Kaszuba | Feb. 8, 1949 |
| 2,485,712 | Doelling et al. | Oct. 25, 1949 |
| 2,564,761 | Hoaglin et al. | Aug. 21, 1951 |
| 2,857,374 | Baird | Oct. 21, 1958 |

OTHER REFERENCES

Pigman et al.: "Chemistry of the Carbohydrates," 1948, pages 221–230, Academic Press Inc., publisher, New York, N.Y.